Jan. 25, 1966 E. KUHNLE ETAL 3,230,922

INDICATOR DEVICE

Filed April 6, 1964

United States Patent Office 3,230,922
Patented Jan. 25, 1966

3,230,922
INDICATOR DEVICE
Ernst Kuhnle and Josef Schwarz, Balingen, Wurttemberg, Germany, assignors to Bizerba-Werke, Wilhelm Kraut K.G., Balingen, Wurttemberg, Germany
Filed Apr. 6, 1964, Ser. No. 357,548
Claims priority, application Germany, Apr. 6, 1963, B 71,441
3 Claims. (Cl. 116—114)

The present invention relates to improvements in an indicator device for measuring instruments, apparatus and the like.

It is known in the art to provide measuring apparatus comprising scales projected onto ground glass which may have a marker line thereon. The conventional form of an indicator device for such apparatus comprises a housing with an opening in which the projected scale graduations appear on said glass for the observer to read with reference to said marker. However, some of these devices have the drawback that under certain room lighting conditions reading of the scale graduations or observance of the marker proper, is rendered difficult.

In one type of conventional measuring apparatus the marker of the indicator device consists of a straight line applied to the glass plate onto which the scale is projected. The glass plate is tinted either with the same color and at the same intensity throughout, or, in other cases, part of the plate is colored and part thereof is transparent. In any case, it is a shortcoming of the device of this type that the coloring makes reading more difficult since it decreases the luminosity of the projected information.

It is an object of the present invention to provide an indicator device which eliminates the aforementioned drawbacks and disadvantages found in conventional prior-art arrangements.

Another object of the invention is to provide a novel indicator device having a glass plate which insures perfect visibility of the projected indications appearing thereon.

In accordance with the present invention, there is provided a novel indicator device for use in connection with a measuring apparatus having a movable scale projected on a ground glass in a known manner. One portion of the glass plate is colorless, the other portion is partly colored, with the intensity of the coloring gradually diminishing away from the uncolored portion such that the numerals can still be easily read by the user on the entire projected scale. A line separating the two portions of the glass plate serves as a marker. The portion of diminishing color terminates in a line preferably having wave-or-zig-zag-like shape so as to prevent confusion with the straight marker line of the indicator plate. Thus, the visibility of the numerals on the projected graduated scale is greatly improved.

Figure 1:
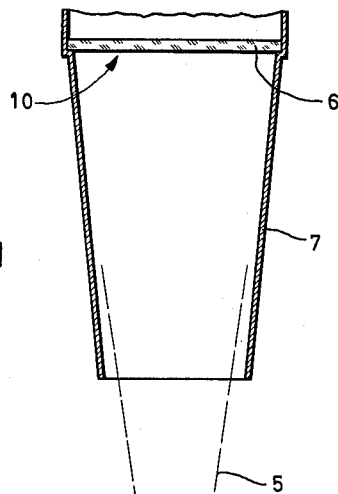
Figure 2:
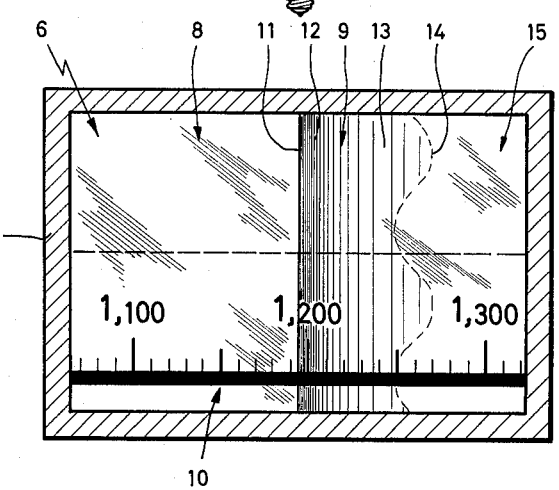

Other features and advantages of the device according to the invention will become apparent from the detailed description of the accompanying drawings, wherein FIG. 1 is a schematic, horizontal sectional, showing of the arrangement including an indicator device according to the invention; and FIG. 2 shows the device in front elevation, and partly in section.

Referring now to FIG. 1, a source of illumination is designated by 1, a condenser by 2; a slide or the like member having a transparent scale provided thereon is shown at 3, and a lens at 4, through which rays 5 are made to pass onto a ground-glass indicator plate 6. A housing for plate 6 is schematically shown at 7. It will be understood by those skilled in the art of measuring apparatus that slide 3 is operatively connected to some type of measuring means (e.g., for weights or other values to be established), for reciprocating it in directions shown by an arrow adjacent thereto.

The ground-glass plate 6 is preferably observed from a direction opposite the path of rays, that is, from the side of plate 6 opposite to that where the projected scale image impinges. With this in mind, the graduations or other indicia of slide 3 are usually made to run backwards, whereby a true (not mirror) image is formed on glass 6.

Referring now to FIG. 2, the ground-glass plate 6 is shown in front elevation and comprises a transparent portion 8 and a partly colored portion 9. The graduations or other like indicia contained on scale 3 are projected on plate 6, forming thereon a scale image 10. As a matter of example, graduations of "1,100, 1,200, 1,300" have been shown which may be indicative of weights, expressed in kilograms and grams, or of any other quantity to be measured, including monetary values, etc.

A vertical marker line 11 is formed on the indicator plate 6 between the transparent portion 8 and the portion 9 of diminishing color density. Section 9 has an area 12 of mostly uniform, transparent coloring, substantially centrally located on plate 6, and an adjoining area 13 in which coloring gradually diminishes to a separating line 14, followed by another transparent, colorless section 15. Line 14 may be straight (not shown) and parallel to line 11, but for clearer distinction it is shown in the preferred embodiment here described to be of wave-like shape; it could also be zig-zag shaped.

The present indicator device may be used in various instruments and apparatus and is of particular use as an indicator for commercial weighing equipment. As there are any number of weighing devices well known to those skilled in the art, it will not be necessary to describe any of these devices in detail.

By limiting the uniformly colored part of the glass plate to a comparatively narrow area 12 and by providing diminishing coloration in area 13 toward the separating line 14, the colorless section 15, it is brought about that the graduations of the projected scale will be much better visible than in the devices known, which have a uniform coloring throughout the right-hand portion of the ground-glass plate.

It should be understood that the present disclosure has been made only by way of example and that numerous changes may be resorted to without departing from the spirit and scope of the invention as hereinafter claimed.

Alternatively there may exist no definite separating line 14 at all, but a gradually shading from the colored area 12 to the colorless section 15.

We claim:

1. An indicator device for use in connection with a measuring apparatus having indicia provided on a movable scale to be projected on a portion of said device, comprising an indicator plate onto which said indicia are projected, said plate comprising a first substantially transparent portion and an adjoining colored portion of gradually diminishing density, a demarcation line being formed by the adjoining edges of said portions, said line forming stationary marker means allowing reading of said indicia with reference thereto, said plate further comprising a second substantially transparent portion adjoining said colored portion on the side opposite to said first transparent portion, wherein the adjoining edges of said second transparent portion and said colored portion form a separating line having a configuration different from that of said demarcation line.

2. An indicator device according to claim 1, wherein said separating line is wave-shaped.

3. An indicator device according to claim 1, wherein said separating line is zig-zag shaped.

References Cited by the Examiner
UNITED STATES PATENTS

| | | | |
|---|---|---|---|
| 1,385,718 | 7/1921 | Schaper | 177—178 |
| 1,623,276 | 4/1927 | Schaper | 88—24 |
| 1,629,680 | 5/1927 | Cooke | 88—24 |
| 1,684,212 | 9/1928 | Berger | 116—129 |
| 1,806,742 | 5/1931 | Cameron | 177—178 |
| 1,828,225 | 10/1931 | Hapgood | 177—178 |
| 1,894,111 | 1/1933 | Marcellus | 116—114.13 |
| 2,078,560 | 4/1937 | Carlson et al. | 33—204 |
| 2,176,673 | 10/1939 | Krause | 88—24 |
| 2,322,813 | 6/1943 | Beck | 88—24 |
| 2,361,349 | 10/1944 | Frazier | 88—24 |
| 2,388,912 | 11/1945 | Hafenl et al. | 88—24 |
| 2,676,515 | 4/1954 | Diehl | 88—24 |
| 2,797,614 | 7/1957 | Heidenhain | 88—24 |

LOUIS J. CAPOZI, *Primary Examiner.*

LEO SMILOW, *Examiner.*